Oct. 6, 1964   H. F. PHIPARD, JR   3,151,519
SCREW HEAD RECESS, METHOD OF MAKING THE
SAME, AND PUNCH FOR USE THEREIN
Filed Oct. 26, 1960                               2 Sheets-Sheet 1
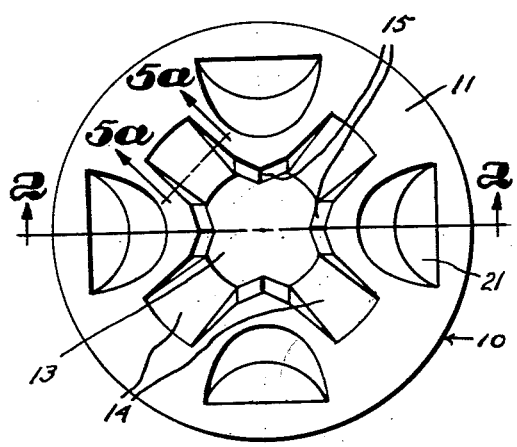
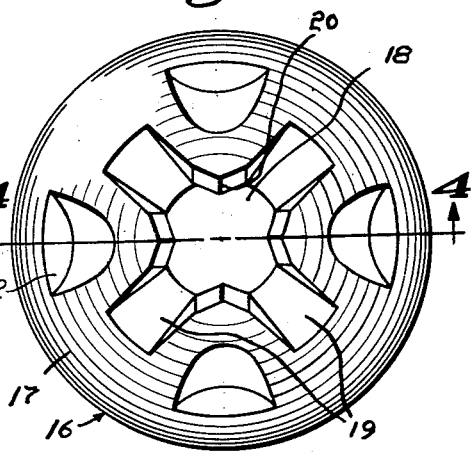
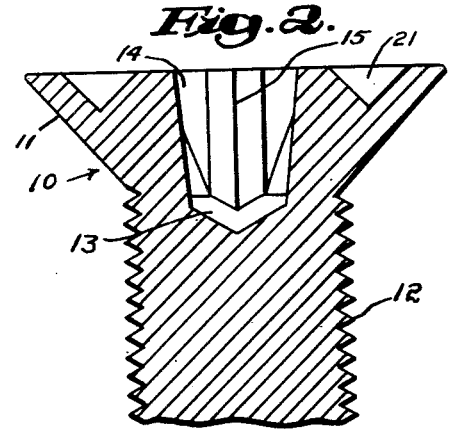
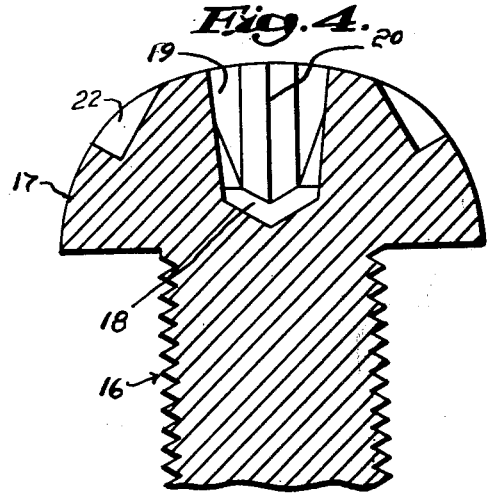
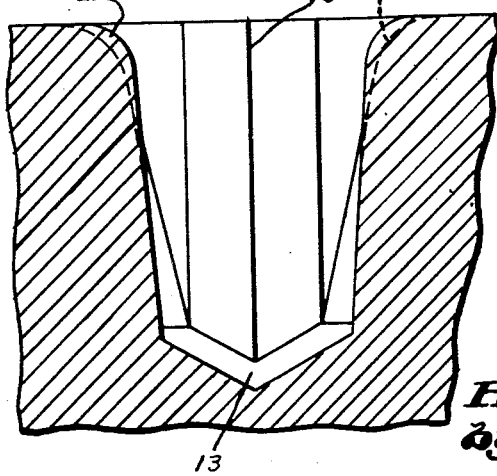
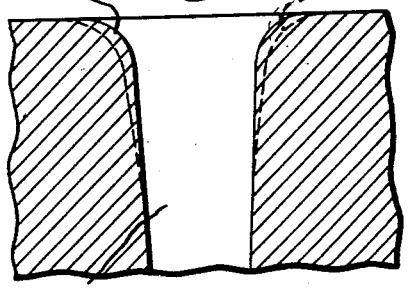
Inventor:
Harvey F. Phipard, Jr.
by Abbott Spear
Attorney Oct. 6, 1964
H. F. PHIPARD, JR
3,151,519
SCREW HEAD RECESS, METHOD OF MAKING THE
SAME, AND PUNCH FOR USE THEREIN
Filed Oct. 26, 1960
2 Sheets-Sheet 2
*Fig.6.*
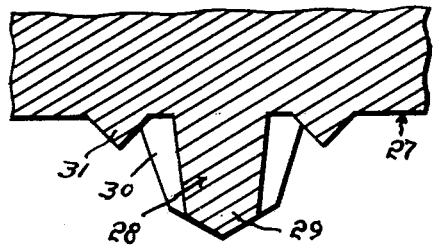
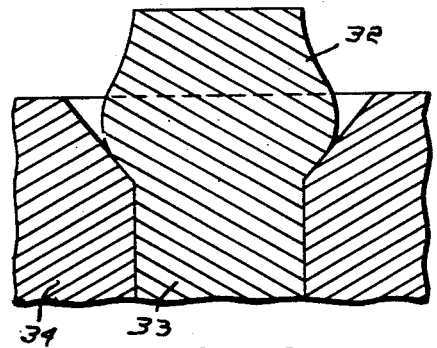
*Fig.7.*
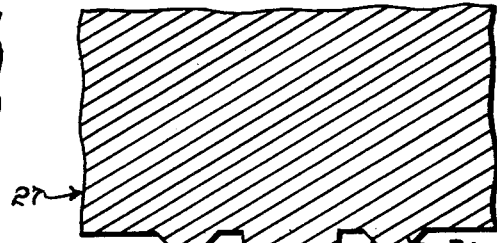
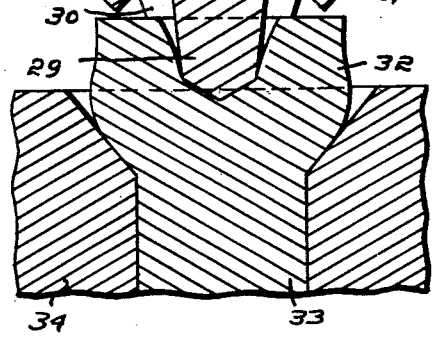
*Fig.8.*
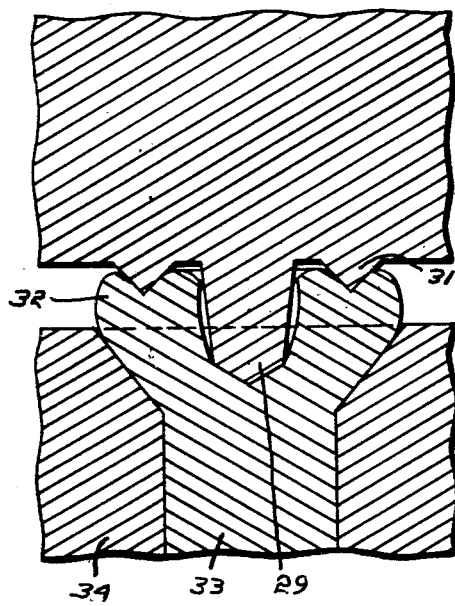
*Fig.9.*
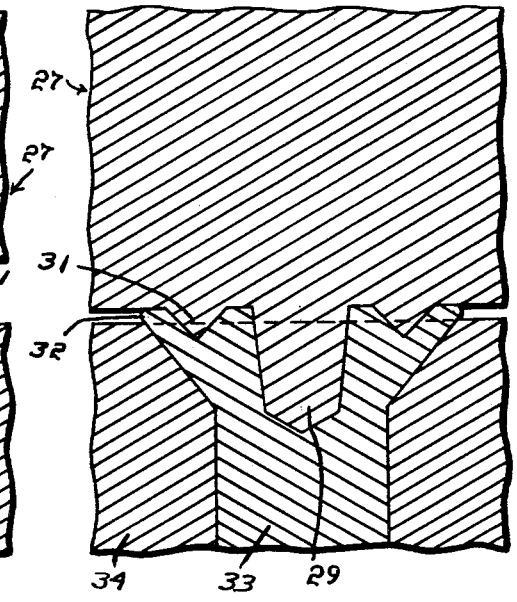
Inventor:
Harvey F. Phipard, Jr.
by
Attorney

United States Patent Office 3,151,519
Patented Oct. 6, 1964

3,151,519
SCREW HEAD RECESS, METHOD OF MAKING THE SAME, AND PUNCH FOR USE THEREIN
Harvey F. Phipard, Jr., South Dartmouth, Mass., assignor to Research Engineering and Manufacturing, Inc., New Bedford, Mass., a corporation of Massachusetts
Filed Oct. 26, 1960, Ser. No. 65,036
2 Claims. (Cl. 85—45)

The present invention relates to rotatable members of the type having a head provided with an axial recess including wings for the reception of a driver fluted to establish a recess entering end and wing-entering driving blades, to the production of such members, and to punches for use in such production.

The invention is herein discussed primarily in connection with screws as screws having head recesses of the above defined type are so widely used that their construction and that of their drivers is well known. The problems with which the invention are concerned will, accordingly, be readily appreciated. These problems stem from the fact that unless the driver mates with the screw recess in the intended manner, it is impossible to apply full driving torque to the screw.

While each screw head recess is designed to enable driving torque to be effectively applied with manually or power operated drivers, the designed recess is not, in fact, reproduced in production. This results from the fact that the recesses are formed by striking the enlarged ends of the blanks, while each is seated in a die, with a punch whose shape and dimensions are that of the driver. The resulting recess is only an approximation of the design as the entry of the punch into the head forming material is attended by a lateral flow of that material which is so substantial, at least in upper portions of the recess, that the driver does not properly seat therein.

By way of examples, it is usual for the recess entering end of the driver to be tapered and dimensioned to seat in the recess with its extremity spaced from the bottom thereof. It is also usual for the leading sides of each recess wing to be designed to be so engaged by the blades of the driver as not to cam the driver out of the recess when driving torque is applied. The flow of the head material, as the punch enters therein, makes it impossible to maintain in production, a satisfactory approximation of the designed recess which contemplated proper engagement by the driver.

The principal objective of the present invention is to enable the shape and dimensions of the recesses in production to be an adequately close approximation of those of the punch to ensure that driving torque can be effectively transmitted under all conditions of use.

In accordance with the invention, this generally stated objective is attained by providing a head of a rotatable member with an axial recess having a plurality of wings extending outwardly therefrom and establishing ribs, one between each two adjacent wings and with indentations spaced outwardly from the recess, the head material, in at least the upper part of the recess, being characterized by the flow of head material inwardly from the indentations.

A recess having the above characteristic is shaped against the punch and hence properly receives mating portions of the driver designed for use therewith. This result is attained by striking the enlarged end of a member blank, while it is held in a die, with a punch having the cross sectional shape and dimensions of a driver of the above identified type, and then striking said head-forming material in a series of zones appropriate to the forcing of head material inwardly against the punch thus to size the recess.

Production, as above summarized, is attained by providing a punch having at its head-forming end, an axial portion including a series of flutes establishing an appropriately shaped end, a series of wings, and a series of projections which are shorter than the axial portion and have surfaces arranged to force material inwardly.

In the accompanying drawings, there are shown illustrative embodiments of the invention from which the above mentioned and other objectives, novel features and advantages will be readily apparent.

In the drawings:

FIG. 1 is an enlarged head end view of one type of screw in accordance with the invention, FIG. 2 is a section taken approximately along the indicated lines 2—2 of FIG. 1, FIG. 3 is a view, similar to FIG. 1, illustrating the head of another type of screw, FIG. 4 is a section taken approximately along the indicated lines 4—4 of FIG. 3, FIG. 5 is a fragmentary section on a further increase of scale, illustrating a central axial recess as viewed along an axial plane corresponding to that on which the sections of FIGS. 2 and 4 are taken, FIG. 5ᵃ is a section, on the scale of FIG. 5, taken transversely of a wing of a head recess, FIG. 6 is a partly sectioned fragmentary view of a screw blank seated in its die and a vertically reciprocable punch, FIG. 7 is a like view illustrating the radially outward flow of head material as the head is penetrated by the recess forming part of the punch, FIG. 8 is a like view illustrating the counter-flow of the head material, as the outwardly spaced, corrective projections of the punch engage the partly formed screw head, and FIG. 9 is a similar view showing the punch fully seated and the head fully formed with head material shaped against the recess forming projection of the punch.

In the embodiment of the invention illustrated by FIGS. 1 and 2, there is shown a generally indicated screw 10 having a flat head 11 and a threaded shank 12. The head 11 has a central axial recess 13 including a plurality of wings 14 which are shown as radially disposed at right angles, each to the two wings proximate thereto. The side walls of the wings are inclined downwardly and inwardly towards each other. Between each two wings 14, the recess has a pair of angularly spaced downwardly and inwardly inclined walls defining a rib 15.

The screw, generally indicated at 16 in FIGS. 3 and 4, is similar except that its head 17 is rounded and its central axial recess 18 is like the recess 13 and including similarly arranged wings 19 whose side walls are downwardly and inwardly inclined towards each other with a downwardly and inwardly inclined rib 20 between each two wings 19.

The screw head recesses, as thus far defined, are conventional and illustrative of the general type with which the invention is concerned. It will be noted that in FIGS. 1 and 2, there are shown head indentations 21, one between each pair of wings 14 and having an arcuate inner edge that is downwardly and outwardly inclined. It will also be noted in FIGS. 3 and 4 that there are head indentations 22, one between each pair of wings 19 with its inner edge arcuate and downwardly and outwardly inclined.

As a consequence of indentations such as the indentations 21 and 22, at least the upper portion of each head recess and its wings has the head material disposed with characteristics of the inward flow thereof. Such flow is indicated at 23 in FIG. 5 and at 24 in FIG. 5ᵃ. In FIG. 5 the dotted line 25 is indicative of the area in a conventional screw of the type under consideration wherein the head material has characteristics of its outward flow, and in FIG. 5a the dotted line 26 indicates a like area in conventional head recess wings. In both FIGS. 5 and 5a, the recess forming punch has the same size and shape which dimensions are also the same for a driver designed for use with the recess formed by that punch. It will be obvious that recesses in accordance with the invention more closely approach the size and shape of the punch and accordingly those dimensions of the driver than do conventional head recesses whose upper portions are characterized by the outward flow of head material.

In accordance with the invention, the close approximation of the head recess to the size and shape of the recess forming punch, and accordingly the driver, is attained by providing a punch which is generally indicated at 27 in FIGS. 6-9. The punch 27 has an axial portion 28, which like a driver, is fluted to provide a tapered end 29 and a series of blades 30. The punch 27 is provided in accordance with the invention, with a series of projections 31, one between each blade 30 and of lesser axial extent than the portion 28 but having a surface downwardly inclined away from the end 27 and the two blades 30 proximate thereto.

In practice, when the punch portion 28 engages and starts its penetration in the enlarged end 32 of a screw blank 33, while it is seated in the indicated die 34, the head material starts to flow outwardly as is illustrated by FIG. 7 so that the upper end of the head recess is oversize. On further penetration of the portion 28, the punch projections 31 strike the partly formed head and initiate a counter-flow of the head material as is illustrated by FIG. 8. At the end of the stroke of the punch 27, illustrated by FIG. 9, the screw head is completely formed and the head material has been caused to flow against the axial portion 28 shaping the recess against its point 29 and blades 30.

I claim:

1. In a screw for use with a driver provided with a series of flutes establishing a series of spaced blades, said screw including a head and a shank, said head being provided with an axial recess having a plurality of wings extending outwardly therefrom, one for each driver blade, and establishing ribs, one between each two adjacent wings, said ribs being arranged for mating engagement with said driver end, said head also having a series of indentations, said recess being within a straight-sided figure, the sides of said figure touching said wings and meeting beyond the ends of wings on the center lines thereof, one indentation between each two wings, each indentation being partly within said figure and spaced inwardly of the periphery of said head, the part of each indentation within said figure being shaped to extend an approximately uniform distance from a substantial length of the proximate edge of said recess between the extremities of the two adjacent wings and being downwardly and outwardly inclined away from the face of said head towards the shank end of the screw, the head material, at least in the upper ends of said recess being characterized by its flow inwardly from said indentations toward said recess in the zone of each of said lengths.

2. In a screw for use with a driver provided with a series of flutes establishing a series of spaced blades, said screw including a head and a shank, said head being provided with an axial recess having a plurality of wings extending outwardly therefrom, one for each driver blade, and establishing ribs, one between each two adjacent wings, said ribs being arranged for mating engagement with said driver end, said head also having a series of indentations, said recess being within a straight-sided figure, the sides of said figure touching said wings and meeting beyond the ends of wings on the center lines thereof, one indentation between each two wings, each indentation being partly within said figure and spaced inwardly of the periphery of said head, the part of each indentation within said figure being shaped to extend an approximately uniform distance from the proximate edge of said recess including substantially the full length of the proximate edges of the two adjacent wings and being downwardly and outwardly inclined away from the face of said head towards the shank end of the screw, the head material, at least in the upper end of said recess being characterized by its flow inwardly from said indentations toward said recess in the zone of each of said lengths.

References Cited in the file of this patent

UNITED STATES PATENTS

| | | |
|---|---|---|
| 438,938 | Nettlefold et al. | Oct. 21, 1890 |
| 2,244,381 | Wilcox | June 3, 1941 |
| 2,377,114 | Tomalis | May 29, 1945 |
| 2,592,462 | Phipard | Apr. 8, 1950 |
| 2,588,404 | Muenchinger | Mar. 11, 1952 |
| 2,667,650 | Friedman | Feb. 2, 1954 |
| 2,673,359 | Stellin | Mar. 30, 1954 |
| 2,800,829 | West | July 30, 1957 |
| 2,986,752 | Lovisek | June 6, 1961 |